3,392,145
POLYMERS OF ARYL EPOXY ETHERS
Kenneth T. Garty, Somerville, and Thomas B. Gibb, Jr., Murray Hill, N.J., assignors to Union Carbide Corporation, a corporation of New York
No Drawing. Filed Mar. 31, 1959, Ser. No. 803,088
15 Claims. (Cl. 260—47)

This invention relates to solid polymers of aryl epoxy ethers and to a method for the production thereof. More specifically, this invention relates to polymers of aryl epoxy ethers having excellent chemical resistivity and thermal stability, which have particular utility in the manufacture of molded articles and in the preparation of film material which can be used in the manufacture of bags, wrapping materials, and the like.

Various methods have been reported in the literature for the production of polymers of aryl epoxy ethers, such as poly(phenyl glycidyl ether). In general, these methods involve the polymerization of phenyl glycidyl ether in the presence of an alkali catalyst such as sodium hydroxide or a Lewis acid such as aluminum chloride. Such methods, however, have been characterized by the formation of undesirable, low molecular weight polymers ranging from viscous oils to amorphous wax-like resins. These products have found little use in the plastics industry as they cannot be shaped or formed into useful articles and consequently are of little, if any, commercial value.

The present invention provides for the production of particularly desirable polymers of aryl epoxy ethers by polymerizing a monomeric aryl epoxy ether and mixtures thereof in the presence of a metal halide-oxirane epoxide complex, which serves as a catalyst, whereby there is produced a solid polymer having a relatively high degree of crystallinity and exhibiting excellent chemical resistivity and thermal stability.

The polymers of the present invention, having excellent chemical resistivity and thermal stability, are characterized by relatively high molecular weights, as manifested by reduced viscosities of at least about 0.3, relatively sharp melting points indicating that the polymers have a relatively high crystalline content, and by melting points in excess of about 100° C.

Apparently the aryl epoxy ethers polymerize through their epoxy group. For example, it is believed that poly-(phenyl glycidyl ether) contains the repeating unit:

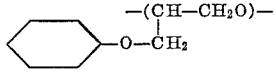

Among aryl epoxy ethers and mixtures thereof which can be polymerized in accordance with the present invention to produce relatively highly crystalline solid polymers are those represented by the formula

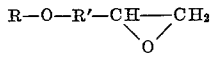

wherein R is an unsubstituted aryl or substituted aryl group and R' is a divalent saturated aliphatic hydrocarbon group. Particularly desirable polymers are those produced by polymerizing a monomer having the formula noted above wherein R' contains from 1 to 4 carbon atoms. Such polymers have a high degree of crystallinity and are therefore capable of use in high temperature applications without being impaired by dimensional changes.

The term polymer as used herein is intended to encompass homopolymers, as well as copolymers and interpolymers produced by polymerizing a mixture containing two or more monomeric aryl epoxy ethers.

Among suitable monomeric aryl epoxy ethers and mixtures thereof which can be polymerized to produce the highly desirable polymers of the present invention can be noted the following: phenyl glycidyl ether, i.e. phenyl-2,3-epoxy propyl ether, phenyl-3,4-epoxy butyl ether, phenyl-4,5-epoxy pentyl ether, phenyl-5,6-epoxy hexyl ether, phenyl-5,6-epoxy-2,4-dimethyl hexyl ether, phenyl-4,5-epoxy-2-ethyl pentyl ether, phenyl-2,3-epoxy-1-isopropyl propyl ether, phenyl-2,3-epoxy-1-butyl propyl ether, phenyl-2,3-epoxy-1-ethyl-propyl ether, phenyl-3,4-epoxy-2,2-dimethyl butyl ether, phenyl-2,3-epoxy-1-hexyl propyl ether, phenyl-5,6-epoxy-2-propyl-2-butyl hexyl ether, and other like compounds.

Extremely desirable polymers are those produced by polymerizing a ring substituted aryl epoxy ether, particularly those having alkyl and/or halogen ring substituents, or a mixture of aryl epoxy ethers containing a ring substituted monomer wherein the resulting polymer contains at least about 2 percent by weight ring substituted monomer chemically combined therein. It has been found that the melting points of solid polymers of aryl epoxy ethers can be varied, as desired, with no loss or degradation of the desirable physical and chemical properties of the polymer by the judicious selection and polymerization of ring substituted aryl epoxy ethers. For example, the melting point of poly(phenyl glycidyl ether) is in the range of from about 196° C. to about 200° C. The melting point of poly(m-methyl phenyl glycidyl ether), i.e. poly(m-methylphenyl-2,3-epoxy propyl ether) is in the range of from about 165° C. to about 169° C. The desirability of obtaining solid polymers having lower melting points is readily apparent in many diverse applications, as an illustration in moulding applications. In such applications polymers having lower melting points are easier to process as they can be molded at lower temperatures and pressures. In addition, polymers of ring substituted aryl epoxy ethers have lower second order phase transition temperatures and are, therefore, more flexible and tougher at room temperature and have less tendency to fracture on being subjected to an outside force.

Illustrative of ring substituted aryl epoxy ethers which can be polymerized are the following: o-methylphenyl-2,3-epoxy propyl ether, m-methylphenyl-2,3-epoxy propyl ether, p-methylphenyl-2,3-epoxy propyl ether, o-isopropyl-phenyl-2,3-epoxy propyl ether, p-isopropylphenyl-2,3-epoxy propyl ether, p-tertiary butylphenyl-2,3-epoxy propyl ether, p-octylphenyl-2,3-epoxy propyl ether, o-chlorophenyl-2,3-epoxy propyl ether, p-chlorophenyl-2,3-epoxy propyl ether, penta-chlorophenyl-2,3-epoxy propyl ether, 2,3-dimethylphenyl-2,3-epoxy propyl ether, 2,4-dimethylphenyl-2,3-epoxy propyl ether, 2,5-dimethylphenyl-2,3-epoxy propyl ether, 2,6-dimethylphenyl-2,3-epoxy propyl ether, 3,4-dimethylphenyl-2,3-epoxy propyl ether, 3,5 dimethylphenyl-2,3-epoxy propyl ether, 3,4-dimethyl-2,5,6-tribromophenyl-2,3-epoxy propyl ether, 3,5-dimethyl-2,4,6-tribromophenyl-2,3-epoxy propyl ether, p-methylphenyl-2,3-epoxy-1-ethyl propyl ether, o-methylphenyl-3,4-epoxy butyl ether, o-allylphenyl-3,4-epoxy butyl ether, p-chlorophenyl-3,4-epoxy-2,2-dimethyl butyl ether, o-allylphenyl-2,3-epoxypropyl ether and the like.

The procedure used to determine the reduced viscosity values noted in this application was as follows. A 0.05 gram sample of polymer was weighed into a 25 ml. volumetric flask and p-chlorophenol containing 2 percent by weight pinene added thereto. The flask was heated for 30 minutes in an oil bath maintained at 140° C. with intermittent swirling. After solution was complete, additional p-chlorophenol containing 2 percent by weight pinene was added to produce a 25 ml. solution while maintaining the flask in a 47° C. constant temperature bath. The solution was thereafter filtered through a sintered glass funnel and the viscosity of a 3 ml. sample determined in a Cannon viscometer at about 47° C.

Reduced viscosity was computed by use of the equation:

$$RV = \frac{ts - to}{cto}$$

where:

*to* is the efflux time for the solvent
*ts* is the efflux time for the polymer solution
*c* is the concentration of the solution in terms of grams of polymer per 100 ml. of solution The second order phase transition temperatures noted herein refer to the inflection temperatures found by plotting the resilience (recovery from 1 percent elongation) of a film ranging in thickness from 3–15 mils against the temperature. A detailed explanation for determining resilience and inflection temperatures is to be found in an article by Alexander Brown in "Textile Research Journal," volume 25, 1955, at page 891.

The metal halides which are reacted with the oxirane monoepoxides to form complexes that can be employed as catalysts in the polymerization of aryl epoxy ethers to solid polymers can be represented by the formula $Me(X)_n$ wherein Me is a transition metal having an atomic number from 26 to 28 inclusive, X is a halide having an atomic number from 17 to 35 inclusive and $n$ is an integer equal in value to the valence of the metal (Me). Illustrative of such metal halides are the following: ferrous bromide ($FeBr_2$), ferrous chloride ($FeCl_2$), ferric bromide ($FeBr_3$), ferric chloride ($FeCl_3$), nickel chloride ($NiCl_2$), nickel bromide ($NiBr_2$) cobaltous chloride ($CoCl_2$), cobaltous bromide ($CoBr_2$), and cobaltic chloride ($CoCl_3$).

Among oxirane monoepoxides which can be complexed with the aforementioned metal halides can be noted the aryl epoxy ethers such as phenyl glycidyl ether, p-chlorophenyl glycidyl ether, tolyl glycidyl ether, and the like, as well as other aryl epoxy ethers previously mentioned in this specification; epihalohydrins, such as epichlorohydrin, epibromohydrin, and the like; alkylene oxides such as ethylene oxide, propylene oxide, 1,2-butylene oxide, 1,2-hexylene oxide, 1,2-heptylene oxide, 1,2-decylene oxide; and other like compounds having a terminal epoxy group.

Specific complexes include among others ferric chloride-propylene oxide complex, ferric chloride-epichlorohydrin complex, ferric chloride-epibromohydrin complex, ferric chloride-phenyl glycidyl ether complex, ferric chloride-1,2-butylene oxide complex, ferric bromide-propylene oxide complex, ferric bromide-epichlorohydrin complex, ferric bromide-1,2-butylene oxide complex, ferrous chloride chloride-propylene oxide complex, ferrous bromide-propylene oxide complex, cobaltic chloride-propylene oxide complex, cobaltic chloride-phenyl glycidyl ether complex, cobaltic chloride-epichlorohydrin complex, cobaltous bromide-propylene oxide complex, cobaltous bromide-epichlorohydrin complex, cobaltous bromide-phenyl glycidyl ether complex, cobaltous chloride-propylene oxide complex, cobaltous chloride-epichlorohydrin complex, cobaltous chloride-phenyl glycidyl ether complex, nickel bromide-epichlorohydrin complex, nickel bromide-propylene oxide complex, nickel bromide-phenyl glycidyl ether complex, nickel chloride-epichlorohydrin complex, nickel chloride-propylene oxide complex, nickel chloride-phenyl glycidyl ether complex, and the like.

Illustrative methods for the production of the metal halide-oxirane monoepoxide complexes are described subsequently in the examples of this specification and also in an article by C. C. Price and M. Osgan in "Journal of the American Chemical Society," vol. 78, 1956, page 4787.

The metal halide-oxirane epoxide complex is generally used in catalytic amounts, i.e. in amounts sufficient to catalyze the polymerization of aryl epoxy ethers to solid polymers. The actual quantity of catalyst used can be varied between wide limits, for example, from about 0.01 to about 10 percent by weight and higher based on the weight of the monomer charged. An amount of catalyst ranging from about 0.2 to about 10 percent by weight is most preferred as within this range optimum conversions of monomer to polymer are effected.

To further indicate the relatively high conversion of monomer to polymer using an amount of catalyst within the preferred range of from about 0.2 to about 10 percent by weight, a series of sealed glass flasks were prepared containing phenyl glycidyl ether, from about 0.1 to about 10 percent by weight of ferric chloride-propylene oxide catalyst based on the weight of the phenyl glycidyl ether, and a nitrogen gas atmosphere. The tubes were heated in an oil bath for 64 hours at 100° C.–105° C. The amount of catalyst used and the percent conversion of monomer to polymer is noted in Table I. The catalyst was prepared according to the procedure described in Example 1 of this specification.

TABLE I

Concentration of catalyst (percent by weight):

| | Percent conversion |
|---|---|
| 0.1 | 5.5 |
| 0.2 | 63 |
| 1.0 | 68 |
| 2.0 | 69 |
| 5 | 61 |
| 10 | 45 |

The percent conversion of monomer to polymer was determined by removing the unreacted monomer and catalyst residue from the polymer and drying the polymer to a constant weight at a temperature of from about 50° C. to 60° C. under a pressure of 50 mm. Hg, weighing the polymer, dividing the weight of polymer obtained by the weight of monomer charged, and multiplying by 100.

The temperature at which the polymerization reaction is conducted can also be varied over a wide range, for example, from about room temperature, i.e. 23° C. to about 150° C. A temperature range from about 60° C. to about 120° C. is preferred as within this range relatively high conversions of monomer to relatively high molecular weight polymers are effected.

The desirability of conducting the polymerization reaction at a temperature of from about 60° C. to about 120° C. is indicated by the tabulated data in Table II. The ferric chloride-propylene oxide complex was prepared as described in Example 1 of this specification. The weight of the catalyst used was based on the weight of the monomer charged. Data which is summarized in Table II was obtained by sealing phenyl glycidyl ether and the indicated amount of catalyst in tubes having a nitrogen gas atmosphere and heating in an oil bath at the temperature and for the time indicated.

TABLE II

| Sample No. | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| Catalyst, percent by wt | 0.05 | .05 | .05 | .05 | 0.5 | 0.5 | 0.5 | 0.5 | 1.5 | 1.5 | 1.5 | 1.5 | 3.0 | 3.0 | 3.0 | 3.0 | 6.0 | 6.0 | 6.0 |
| Temperature, °C | 30 | 60 | 90 | 120 | 30 | 60 | 90 | 120 | 30 | 60 | 90 | 120 | 30 | 60 | 90 | 120 | 60 | 90 | 120 |
| Time, hours | 24 | 24 | 24 | 24 | 23 | 23 | 23 | 23 | 24 | 24 | 24 | 24 | 24 | 24 | 24 | 24 | 23 | 23 | 23 |
| Percent Conversion | 0.04 | 0.06 | 0.3 | 2.2 | 1.4 | 16.7 | 61.9 | 87.5 | 5.0 | 52.8 | 90.9 | 93.4 | 9.2 | 54.1 | 77.0 | 55.0 | 68.6 | 53.5 | 39.5 |
| Reduced Viscosity | | | 0.9 | 1.3 | 0.5 | 5.1 | 3.3 | 2.0 | 0.9 | 3.1 | 2.5 | 1.2 | 2.0 | 2.0 | 1.4 | 0.6 | 1.5 | 0.4 | 0.3 |

The actual time required to polymerize an aryl epoxy ether to produce a solid polymer will vary and depend upon a number of factors, such as the monomer itself, the amount of catalyst used, and the temperature at which the polymerization reaction is conducted. Usually the reaction time will vary from about 12 to about 120 hours.

The polymers of this invention can be prepared by charging the monomer or mixture of monomers and catalyst and if desired, a controlled amount of water, into a vessel, usually a closed vessel, and subjecting the vessel to heat. Instead of conducting the polymerization reaction en masse as described, a solution or suspension polymerization technique can also be employed.

Generally, it is preferred to conduct the polymerization reaction in the presence of an organic diluent which is non-reactive with respect to the monomer, catalyst and polymer, is a solvent for the monomer and catalyst mixture, but a non-solvent for the polymer. During the polymerization reaction, particularly whenever about 50 percent or more of the monomer is converted to the polymer, the reaction mixture becomes highly viscous and accumulates a large amount of heat. If a diluent is not present, it is difficult to agitate the reaction mixture in order to dissipate the accumulated heat which, if allowed to build up, might cause undesirable side reactions to occur. In addition, the use of a diluent facilitates removal of the unreacted monomer and catalyst residue from the polymer by a simple washing operation.

Illustrative of suitable organic diluents can be mentioned the aromatic hydrocarbons, such as benzene, chlorobenzene, toluene, xylene, and the like; aliphatic hydrocarbons, such as pentane, hexane, heptane, and the like; cycloaliphatics, such as cyclopentane, cyclohexane, isopropyl cyclohexane, and the like; halogenated aliphatic hydrocarbons, such as ethylene chloride and the like; alkoxy compounds, such as methoxy benzene and the like. Also suitable are the dimethyl and diethyl ethers of ethylene glycol, propylene glycol, diethylene glycol, and the like.

The diluent can be added prior to the commencement of the polymerization reaction or at any time during the polymerization reaction, in amounts from about 5 to about 90 parts by weight per 100 parts by weight monomer and diluent.

The use of a diluent has no adverse affect upon the polymerization reaction, that is, the use of a diluent does not adversely affect the percent conversion of monomer to polymer, nor does the use of a diluent result in the production of undesirable low molecular weight polymers. To further indicate that no ill effects are produced by the use of a diluent, phenyl glycidyl ether with 1 percent by weight of a ferric chloride-propylene oxide catalyst prepared in a manner described in Example 1 and a diluent were sealed in a glass tube under a nitrogen atmosphere and the tube heated in an oven at 90° C. for 24 hours. Results of such a polymerization are noted in Table III.

TABLE III

| Diluent | Ratio of Diluent to monomer in parts by weight | Percent Conversion of Monomer to Polymer | Reduced viscosity of polymer |
|---|---|---|---|
| Toluene | 50 parts diluent, 60 parts monomer. | 53.7 | 3.24 |
| None | | 54.6 | 3.87 |

The polymerization reaction can be conducted under atmospheric, sub-atmospheric, or super-atmospheric pressures. It is also preferred to conduct the polymerization reaction under an inert atmosphere.

The crude product resulting from the polymerization reaction contains, in addition to the solid polymer, usually some unreacted monomer and also catalyst residue. Generally it is desirable to remove such impurities from the polymer as such polymer tends to have better thermal and dimensional stability. Removal of impurities can be accomplished by any convenient manner, for example, by dispersing the product in acetone containing a mineral acid such as hydrochloric acid, filtering the dispersion thereby obtaining the polymer as a filter cake, and, if necessary, then washing the polymer with small amounts of ethyl alcohol and the like to obtain a white colored solid.

In each of the following examples which are illustrative and are not intended in any way to limit the scope of the invention, the flasks in which the polymerization reactions were conducted were thoroughly dried and purged of air by means of a stream of nitrogen gas. Also, the nitrogen gas was continuously bubbled into the reaction flasks whereby a blanket of an inert gaseous atmosphere was maintained therein during the polymerization reaction.

EXAMPLE 1

The catalyst used in the polymerization reaction illustrated by this example was ferric chloride-propylene oxide complex.

This example also illustrates the use of a diluent such as toluene as an aid in controlling the polymerization reaction involving the polymerization of relatively large amounts of an aryl epoxy ether and also as an aid in obtaining the polymer in a readily recoverable form.

15.1 grams of ferric chloride-propylene oxide complex were slowly added to a glass flask containing 1500 grams of distilled phenyl glycidyl ether. After heating for two hours at 80° C., the brown colored solution became viscous due to polymer formation. 2250 grams of toluene were then slowly added to the viscous solution.

Heating was continued for an additional 24 hours at 80° C., at the end of which time a thick gel-like polymer of phenyl glycidyl ether was produced. The polymerization reaction was then terminated by adding three liters of toluene to the reaction flask. The toluene was removed from the polymer by a decantation and pressing operation whereby the polymer was obtained as a brown colored, finely divided solid.

The brown colored, finely divided polymer was then dispersed in 6 liters of acetone containing 250 ml. of a 1.5 N hydrochloric acid whereby the catalyst settled out as a white colored solid. The polymer was recovered as a filter cake, washed with small quantities of acetone and ethyl alcohol and then dried to a constant weight at 50° C. under a pressure of 20 mm. Hg.

635 grams of a white colored polymer were obtained.

An additional 102 grams of white colored polymer were obtained from the toluene solution from which the polymer was recovered prior to being dispersed in acetone by concentrating the toluene solution by a heating operation and pouring the concentrated solution into ethyl alcohol whereby the brown colored poly(phenyl glycidyl ether) precipitated out. The brown colored polymer was washed and dried according to the procedures described above and recovered as a finely divided white solid having a 2nd order phase transition temperature of about 17° C.

The poly(phenyl glycidyl ether) had a reduced viscosity of 2.1 and a melting point of 200° C., as determined in a capillary tube.

The excellent chemical resistivity of the polymer is clearly indicated by the following:

The polymer was insoluble in water, methyl and ethyl alcohols, diethyl ether, dioxane, acetone, methyl ethyl ketone, ethyl acetate, tetrahydrofuran, chloroform, methylene chloride, carbon disulfide, benzene, toluene, and xylene. Fractions of the polymer appeared to dissolve on boiling in dioxane, methyl isobutyl ketone, butyl cellosolve, nitromethane, toluene, and xylene. Solutions of the polymer were obtained in the following solvents on boiling or heating at 150° C.: pyridine, acetophenone, N,N-dimethyl formamide, dimethyl sulfoxide, phenol, tetrachloroethane, parachlorophenol, and para-methylanisole. On cooling to room temperature, the polymer crystallized out of solution of the above listed compounds with the exception of tetrachloroethane and para-chlorophenol. Solutions of the polymer in tetrachloroethane and para-chlorophenol were found to be stable at room temperature.

The ferric chloride-propylene oxide complex used to catalyze the polymerization of phenyl glycidyl ether to a solid polymer was prepared by adding dropwise 63 ml. of propylene oxide to a mixture of 27 grams of anhydrous ferric chloride in 90 ml. of diethyl ether while maintaining the temperature of the ferric chloride-diethyl ether solution at −10° C. The reaction mixture was then allowed to stand until its temperature reached about 23° C., i.e. room temperature. The excess propylene oxide was evaporated off under reduced pressure of 10 mm. Hg. The viscous oil remaining was dissolved in 240 ml. of acetone and the solution filtered through a sintered glass funnel. The filtered solution was then poured into 11 liters of acetone whereupon a semi-solid tan colored residue precipitated out. The semi-solid residue was then removed from the organic solvents by filtration and dried by warming slightly under a pressure of 10 mm. Hg. 16.5 grams of the ferric chloride-propylene oxide complex were obtained in the form of a tan colored powder.

EXAMPLE 2

The catalyst complex used in the reaction illustrated by this example to catalyze the polymerization of an aryl epoxy ether was ferric chloride-propylene oxide complex.

30 grams of distilled phenyl glycidyl ether were placed in a glass flask and one gram of ferric chloride-propylene oxide complex added thereto. There was a slight exothermic reaction as the solid ferric chloride-propylene oxide catalyst dissolved in the liquid phenyl glycidyl ether. Once the complex had completely dissolved the resultant brown colored solution was heated on a steam bath at 90° C.–95° C. for 32 hours. At the end of 32 hours a solid polymer, dark brown in color, was obtained. The solid polymer was mechanically ground into a pasty solid and washed with consecutive, small portions of ethyl alcohol, dioxane, dimethyl formamide, and dilute HCl until the catalyst residue was removed from the polymer and the polymer recovered as a white colored, finely divided solid. On drying the polymer in a manner described in Example 1, 27.1 grams of the polymer were obtained.

The poly(phenyl glycidyl ether) had a reduced viscosity of 1.1 and melted to a colorless viscous resin at 204° C. Analysis of the polymer for carbon, hydrogen, and oxygen gave the following values in percent by weight: carbon, 71.9; hydrogen, 7.3; oxygen, 20.8; calculated values based on $C_9H_{10}O_2$: carbon, 72; hydrogen, 6.7; oxygen, 21.3.

The ferric chloride-propylene oxide catalyst complex was prepared by dissolving 3 grams of anhydrous ferric chloride in 30 ml. of diethyl ether, cooling the solution to a temperature between 0 and −10° C., slowly adding thereto 7 ml. of propylene oxide, stirring the mixture for one half hour and then warming to room temperature. The diethyl ether and excess propylene oxide were evaporated off under reduced pressure (1–2 mm. Hg) and the resultant viscous oil dissolved in 100 ml. of acetone. The acetone solution was filtered into 2 liters of n-hexane whereupon the ferric chloride-propylene oxide complex precipitated out of solution. The complex was dried under reduced pressures of 1–2 mm. Hg and recovered as a tan colored powder. Two grams of the complex were obtained. The complex was found to contain 27 percent by weight iron and 17 percent by weight chlorine.

EXAMPLE 3

This example illustrates the use of ferric chloride-phenyl glycidyl ether complex as a catalyst in the polymerization of an aryl epoxy ether.

Polymers of phenyl glycidyl ether were prepared by sealing phenyl glycidyl ether and the ferric chloride-phenyl glycidyl ether complex in glass tubes containing a nitrogen gas atmosphere and heating the glass tubes in an oven maintained at 90° C. for 72 hours. The amounts of monomeric phenyl glycidyl ether and catalyst used, also the amounts of polymer recovered, as well as the reduced viscosities and melting points thereof are noted in the table below. The polymer was washed and dried in a manner described in Example 1.

| | 1 | 2 |
|---|---|---|
| Phenyl glycidyl ether in grams | 5.5 | 5.5 |
| Ferric chloride-phenyl glycidyl-ether complex in grams | 0.8 | 1.6 |
| Poly(phenyl glycidyl ether) recovered in grams | 1.9 | 3.3 |
| Reduced viscosity of the polymer | 2.9 | 1.6 |
| Melting temperature of the polymer in ° C | 197–200 | 196–201 |
| Color of polymer | White | White |

The ferric chloride-phenyl glycidyl ether complex was prepared by adding, dropwise, 22 grams of phenyl glycidyl ether to a solution of 3.5 grams of ferric chloride in 30 grams of diethyl ether while maintaining the temperature of the ether solution at 0 to −10° C. The addition of the phenyl glycidyl ether was completed in ½ hour. The mixture was warmed to room temperature, the ether and excess phenyl glycidyl ether were evaporated off under reduced pressures of 1 to 2 mm. Hg and the resultant viscous oil dissolved in 100 ml. of acetone. The acetone solution was filtered into 2 liters of n-hexane whereupon the ferric chloride-phenyl glycidyl ether complex precipitated out of solution. The complex was dried at room temperature under reduced pressures of 1–2 mm. Hg to a constant weight and recovered as a tan colored powder. 4.6 grams of the complex were obtained containing 13 percent by weight iron and 2.3 percent by weight chlorine.

EXAMPLE 4

The catalyst complex used in this example was ferric chloride-phenyl glycidyl ether complex prepared as described in Example 3.

12.8 grams of the ferric chloride-phenyl glycidyl ether complex were added to a glass flask containing 250 grams of phenyl glycidyl ether and 250 grams of toluene. After heating the mixture for three days at 90° C., a brown colored, finely divided, solid polymer was obtained. 250 grams of acetone containing 15 ml. of 1 N HCl were added to the polymer in the glass flask and the material agitated. The polymer was recovered as a white colored solid upon removing the liquids therefrom. The polymer was washed with small portions of ethanol, recovered, and dried at 23° C. at a pressure of 1–2 mm. Hg. 60 grams of a white colored polymer were recovered.

The polymer had a reduced viscosity of 1.34 and a melting point between 200° C.–204° C.

Similarly, ferric bromide-phenyl glycidyl ether complex prepared in a manner described in Example 3 with the exception that ferric bromide was used in lieu of the ferric chloride and used as a catalyst to polymerize phenyl glycidyl ether resulted in a polymer having a reduced viscosity and melting temperature comparable to that noted in Example 4 above.

EXAMPLE 5

This example illustrates the use of ferric chloride-epichlorohydrin complex as the catalyst in the polymerization of an aryl epoxy ether.

One gram of ferric chloride-epichlorohydrin complex was added to a glass flask containing 150 grams of phenyl glycidyl ether and 150 grams of toluene. The mixture was heated for 24 hours, whereupon a brown colored solid polymer was formed. The polymer was recovered, filtered, and dried in a manner described in Example 1. 24 grams of a white colored, finely divided polymer were obtained.

The polymer had a reduced viscosity of 1.3.

The ferric chloride-epichlorohydrin complex was prepared by adding dropwise 15 grams of epichlorohydrin to a flask containing a solution of 3 grams of ferric chloride in 60 ml. of diethyl ether. The ether solution was maintained at −10° C. during the addition of epichlorohydrin thereto. The resultant mixture was allowed to reach room temperature and thereafter the liquid volatiles were allowed to evaporate off under reduced pressures of 1–2 mm. Hg. The viscous oil remaining was dissolved in 75 ml. of acetone and the acetone solution filtered into 2 liters of n-hexane wherein the complex precipitated out as a tan colored precipitate. The complex was dried under reduced pressures of 1–2 mm. Hg and recovered as a tan colored powder. 17 grams of the complex were obtained.

The examples which follow illustrate that by polymerizing ring substituted aryl epoxy ethers polymers can be produced having significant changes in their melting point, rate of crystallization, and degree of crystallinity. Sealed glass tubes in which the polymerization reactions were conducted had a nitrogen atmosphere.

EXAMPLE 6

A solution containing 0.075 gram of ferric chloride-propylene oxide complex prepared in a manner described in Example 2, 5 ml. of a phenyl-2,3-epoxy propyl ether, and 7.5 ml. of dry toluene was charged into an 18 by 150 mm. Pyrex glass tube. The glass tube was sealed and heated in a 90° C. circulating air oven for 88 hours whereupon a brown colored solid polymer formed. The crude product was placed in a Waring Blendor, 100 ml. of toluene added thereto, and the product ground into a paste. 100 ml. liters of acetone containing 2.5 ml. of a 1.5 N hydrochloric acid were then added into the Blendor thereby forming a dispersion of the solid product. The dispersion was then poured into a flask containing 3 liters of ethanol whereby the poly(aryl glycidyl ether) separated out as a finely divided white colored precipitate. The polymer was dried for 24 hours at a temperature of 25° C.–35° C. at a pressure of 20–30 mm. Hg.

The phenyl-2,3-epoxy propyl ether polymerized, percent conversion of monomer to polymer and physical properties of the polymers are indicated in the table below.

| Substitutent on the Aryl Ring | o-CH³ | m-CH³ | p-CH³ | o-Cl | p-Cl | II |
|---|---|---|---|---|---|---|
| Percent conversion | 76 | 83 | 74 | 71 | 50 | 35 |
| Reduced Viscosity | 2.5 | 2.2 | 3.1 | 4.7 | 2.4 | 3.2 |
| Melting Point in ° C | 189–191 | 165–169 | 207–212 | 181–183 | 170–176 | 197–202 |
| Relative Cyrstallinity | 7 | 6 | 5 | 10 | 8 | 8 |

Relative crystallinity was determined by observing annealed films through a 7.5 power polarizing microscope. Rating system is based on a maximum of 10 for a film having the greatest density of spherulites down to zero for a film containing no visible spherulites.

Samples of film were prepared by heating the powdered polymer to 10° C. above its melting point between glass plates. Annealing was accomplished by placing the plates holding the samples in a 210° C. circulating air oven which was turned off after 20 minutes and allowed to cool slowly to room temperature.

Properties of the ring-substituted phenyl glycidyl ether polymers with respect to chemical resistivity are comparable to those of poly(phenyl glycidyl ether).

EXAMPLE 7

Solid polymers of phenyl-2,3-epoxy propyl ethers having substituents on the aryl ring were prepared in a manner described in Example 6. The substituents on the ring and the reduced viscosity of the resultant polymers are noted in the following table.

| Substituent on the Aryl Ring | p-CH(CH₃)₂ | p-C(CH₃)₃ | p-C₈H₁₇ |
|---|---|---|---|
| Percent Conversion | 79 | 20 | 5 |
| Reduced Viscosity | 0.9 | 1.6 | 0.7 |

EXAMPLE 8

A series of reaction mixtures was prepared using phenyl glycidyl ether and o-chlorophenyl-2,3-epoxy propyl ether in varying amounts. The amounts of ferric chloride-propylene oxide catalyst and toluene diluent and the procedure employed were the same as described in Example 6. Results are summarized in the table below. Chemical resistivity of the ring substituted phenyl glycidyl ethers polymerized with phenyl glycidyl ether, i.e. copolymers of o-chlorophenyl-2,3-epoxy propyl ether-phenyl glycidyl ether was comparable to that of poly (phenyl glycidyl ether). The monomers chemically combined in essentially the same percent by weight as charged.

| o-Chlorophenyl-2,3-epoxy propyl ether (parts by weight) | 0 | 4 | 27 | 52 | 76 | 100 |
|---|---|---|---|---|---|---|
| Phenyl glycidyl ether (parts by weight) | 100 | 96 | 73 | 48 | 24 | 0 |
| Percent Conversion | 21 | 19 | 15 | 19 | 21 | 22 |
| Reduced Viscosity | 3.8 | 3.1 | 2.1 | 2.7 | 2.2 | 3.2 |
| Melting Point, deg | 195–203 | 192–194 | 188–192 | 175–181 | 170–175 | 179–180 |

EXAMPLE 9

A series of reaction mixtures was prepared using phenyl glycidyl ether and o-methylphenyl-2,3-epoxy propyl ether in varying amounts. The amounts of ferric chloride-propylene oxide catalyst and toluene diluent and the procedure employed were the same as described in Example 6. Results are summarized in the table below. Chemical resistivity of the aryl-substituted polymers, i.e. copolymers of orthomethylphenyl-2,3-epoxy propyl ether and phenyl glycidyl ether was comparable to that of poly (phenyl glycidyl ether). The monomers chemically combined in essentially the same percent by weight as charged.

| o-Methylphenyl-2,3-epoxy propyl ether (parts by weight) | 0 | 5 | 24 | 48 | 74 | 100 |
|---|---|---|---|---|---|---|
| Phenyl glycidyl ether (parts by weight) | 100 | 95 | 76 | 52 | 26 | 0 |
| Percent Conversion | 50 | 46 | 54 | 69 | 79 | 84 |
| Reduced Viscosity | 2.6 | 3.0 | 2.8 | 2.6 | 2.3 | 2.1 |
| Melting Point, deg | 196–202 | 191–194 | 177–185 | 176–180 | 193–195 | 203–206 |

What is claimed is:

1. A polymer having a reduced viscosity of at least about 0.3, when measured at about 47° C. in p-chlorophenol containing 2% by weight pinene at a concentration of 0.05 gram/25 ml. of solution and having a melting point in excess of about 100° C. which is a member selected from the group consisting of (1) homopolymers of a monomer having the formula

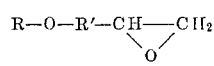

wherein R is a member selected from the group consisting of (a) halophenyl, (b) aliphatic hydrocarbon substituted phenyl wherein each aliphatic hydrocarbon substituent contains a maximum of 8 carbon atoms and (c) aliphatic hydrocarbon substituted halophenyl wherein each aliphatic hydrocarbon substituent contains a maximum of 8 carbon atoms and wherein R' is a divalent saturated aliphatic hydrocarbon group; (2) polymers of a monomer having the formula

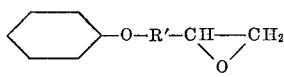

wherein R' is as previously defined, with at least one monomer selected from the group consisting of those monomers defined by (a), (b) and (c); (3) polymers of a monomer defined by (a) with at least one monomer selected from the group consisting of the monomers defined by (b) and (c); and (4) copolymers of a monomer defined by (b) with a monomer defined by (c) said monomers having polymerized through their epoxy groups to said polymers.

2. A homopolymer of a monomer having the formula

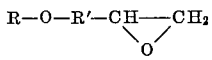

wherein R is alkylphenyl wherein each alkyl contains a maximum of 8 carbon atoms and R' is a divalent saturated aliphatic hydrocarbon group, said monomer having polymerized to said homopolymer through its epoxy group, said homopolymer having a reduced viscosity of at least about 0.3, when measured at about 47° C. in p-chlorophenol containing 2% by weight pinene at a concentration of 0.05 gram/25 ml. of solution and having a melting point in excess of about 100° C.

3. A homopolymer of o-methylphenyl-2,3-epoxy propyl ether, said monomer having polymerized to said homopolymer through its epoxy group, said homopolymer having a reduced viscosity of at least about 0.3, when measured at about 47° C. in p-chlorophenol containing 2% by weight pinene at a concentration of 0.05 gram/25 ml. of solution and having a melting point in excess of about 100° C.

4. A homopolymer of m - methylphenyl - 2,3 - epoxy propyl ether, said monomer having polymerized to said homopolymer through its epoxy group, said homopolymer having a reduced viscosity of at least about 0.3, when measured at about 47° C. in p-chlorophenol containing 2% by weight pinene at a concentration of 0.05 gram/25 ml. of solution and having a melting point in excess of about 100° C.

5. A homopolymer of p-methylphenyl-2,3-epoxy propyl ether, said monomer having polymerized to said homopolymer through its epoxy group, said homopolymer having a reduced viscosity of at least about 0.3, when measured at about 47° C. in p-chlorophenol containing 2% by weight pinene at a concentration of 0.05 gram/25 ml. of solution and having a melting point in excess of about 100° C.

6. A homopolymer of o - isopropylphenyl - 2,3 - epoxy propyl ether, said monomer having polymerized to said homopolymer through its epoxy group, said homopolymer having a reduced viscosity of at least about 0.3, when measured at about 47° C. in p-chlorophenol containing 2% by weight pinene at a concentration of 0.05 gram/25 ml. of solution and having a melting point in excess of about 100° C.

7. A homopolymer of p - isopropylphenyl - 2,3 - epoxy propyl ether, said monomer having polymerized to said homopolymer through its epoxy group, said homopolymer having a reduced viscosity of at least about 0.3, when measured at about 47° C. in p-chlorophenol containing 2% by weightpinene at a concentration of 0.5 gram/25 ml. of solution and having a melting point in excess of about 100° C.

8. A homopolymer of p-tertiary butylphenyl-2,3-epoxy propyl ether, said monomer having polymerized to said homopolymer through its epoxy group, said homopolymer having a reduced viscosity of at least about 0.3, when measured at about 47° C. in p-chlorophenol containing 2% by weight pinene at a concentration of 0.5 gram/25 ml. of solution and having a melting point in excess of about 100° C.

9. A homopolymer of p-octylphenyl-2,3-epoxy propyl ether, said monomer having polymerized to said homopolymer through its epoxy group, said homopolymer having a reduced viscosity of at least about 0.3, when measured at about 47° C. in p-chlorophenol containing 2% by weight pinene at a concentration of 0.05 gram/25 ml. of solution and having a melting point in excess of about 100° C.

10. A homopolymer of o - chlorophenyl - 2,3 - epoxy propyl ether, said monomer having polymerized to said homopolymer through its epoxy group, said homopolymer having a reduced viscosity of at least about 0.3, when measured at about 47° C. in p-chlorophenol containing 2% by weight pinene at a concentration of 0.05 gram/25 ml. of solution and having a melting point in excess of about 100° C.

11. A homopolymer of p - chlorophenyl - 2,3 - epoxy propyl ether, said monomer having polymerized to said homopolymer through its epoxy group, said homopolymer having a reduced viscosity of at least about 0.3, when measured at about 47° C. in p-chlorophenol containing 2% by weight pinene at a concentration of 0.05 gram/25 ml. of solution and having a melting point in excess of about 100° C.

12. A phenyl glycidyl ether-o-chlorophenyl-2,3-epoxy propyl ether copolymer, said monomers having polymerized to said copolymer through their epoxy group, said copolymer have a reduced viscosity of at least about 0.3, when measured at about 47° C. in p-chlorophenol containing 2% by weight pinene at a concentration of 0.05 gram/25 ml. of solution and having a melting point in excess of about 100° C.

13. A phenyl glycidyl ether-p-methylphenyl-2,3-epoxy propyl ether copolymer, said monomers having polymerized to said copolymer through their epoxy group, said copolymer having a reduced viscosity of at least about 0.3, when measured at about 47° C. in p-chlorophenol containing 2% by weight pinene at a concentration of 0.05 gram/25 ml. of solution and having a melting point in excess of about 100° C.

14. A homopolymer of a monomer having the formula $$R-O-R'-CH\underset{O}{-\!\!\diagdown\!\!\diagup\!\!-}CH_2$$

wherein R is a halophenyl and R' is a divalent saturated aliphatic hydrocarbon group, said monomer having polymerized to said homopolymer through its epoxy group, said homopolymer having a reduced viscosity of at least about 0.3, when measured at about 47° C. in p-chlorophenol containing 2 percent by weight pinene at a concentration of 0.05 gram/25 ml. of solution, and having a melting point in excess of about 100° C.

15. A cyrstalline homopolymer of o - chlorophenyl-glycidyl ether or of p-chlorophenyl glycidyl ether, said homopolymer having a melting point between about 170° C. and 183° C. and having a reduced viscosity of at least about 0.3 when measured at about 47° C. in p-chlorophenol containing 2% by weight pinene at a concentration of 0.05 gram/25 ml. of solution.

References Cited
UNITED STATES PATENTS

| | | | |
|---|---|---|---|
| 2,653,142 | 9/1953 | Cody et al. | 260—47 |
| 2,731,429 | 1/1956 | Cody et al. | 260—47 |
| 2,873,258 | 2/1959 | Borkovec | 260—2 |
| 2,916,463 | 12/1959 | Blanchette | 260—2 |
| 3,014,890 | 12/1961 | Bradley et al. | 260—47 |
| 2,970,984 | 2/1961 | D'Alelio | 260—47 |
| 2,706,181 | 4/1955 | Pruitt et al. | 260—2 |
| 3,135,705 | 6/1964 | Vanderberg | 260—2 |

(Other references on following page)

FOREIGN PATENTS 477,843  1/1938  Great Britain.

OTHER REFERENCES

Webster's "New International Dictionary," p. 158, item "aryl." G. & C. Merriam Co., publ., Springfield, Mass. (1956), 2nd ed.

Furukawa et al.: Bull. Inst. Chem. Research, Kyoto Univ., 30, pp. 50–52, 1952. (Copy in Scientific Library.)

The Van Nostrand Chemist's Dictionary, D. Van Nostrand Co., Inc., N.Y., 1953, p. 44 relied on.

WILLIAM H. SHORT, *Primary Examiner.*

M. STERMAN, P. E. MANGAN, D. N. BURNSTEIN, LOUISE P. QUAST, *Examiners.*

D. A. HOES, T. D. KERWIN, A. LIBERMAN, S. N. RICE, *Assistant Examiners.*